UNITED STATES PATENT OFFICE.

EDWARD C. L. KRESSEL, OF CAMDEN, NEW JERSEY.

FERTILIZER AND PROCESS FOR MAKING SAME.

1,225,825.	Specification of Letters Patent.	Patented May 15, 1917.

No Drawing.	Application filed July 21, 1914.	Serial No. 852,292.

*To all whom it may concern:*

Be it known that I, EDWARD C. L. KRESSEL, a citizen of Germany, and a resident of Camden, in the county of Camden and State of New Jersey, have invented a certain new and useful Fertilizer and Process for Making Same, of which the following is a specification.

My invention relates to fertilizers and to a process for producing the same from the waste liquor from sulfite pulp mills, with the twofold object in view to prevent the pollution of rivers by the waste product of the paper industries and its conversion into a source of profit and utility.

How to dispose of the waste liquor from the sulfite pulp mills, is a problem which dates back to the beginning of this industry. Ordinarily the waste liquor from the digesters, screens, filters and condensers is discharged into the rivers and, on account of its great volume and high content of organic matter, becomes a source of pollution which renders the water injurious to life and health and even unfit for boiler purposes.

Many unsuccessful attempts have been made to dispose of this waste by processes of neutralization, evaporation, concentration, etc., but on account of the prohibitive costs, the hygroscopic properties of the resultant product and the very limited demand for such product, it proved to be a failure.

The chief object of my invention is to convert the waste liquor from sulfite pulp mills and the like into an effective, inexpensive, and practically odorless and non-putrescible fertilizer in the form of a brown powder, the resultant product being practically non-hygroscopic.

With these and other objects in view, my invention comprises the product and process hereinafter described and embraced within the scope of the appended claims.

While the chemistry of the waste liquor from sulfite pulp mills is rather complicated, it is well to observe that it contains from 12 to 15 per cent. of solid matter, 15 to 20 per cent. whereof is organic, it also contains a comparatively large amount of sulfur compounds both organic and inorganic and equivalent to 3 per cent. of $SO_3$, and also the metals calcium and magnesium.

The following is a preferred process for converting sulfite waste liquor into a fertilizer:—The waste liquor from the pulp digesters and filter presses is diverted into convenient tanks, where it is treated with a biological reagent or ferment, such as brewers' or distillers' yeast and stable manure or soil, either singly or in combination. The mass is then allowed to ferment at a temperature between 30 and 40 degrees centigrade for about 24 hours. The fermentation is then interrupted which leaves the final product in a dormant state, ready to be active when applied to soil as a fertilizer. Care must be taken to interrupt the fermentation at the proper time, as it may otherwise result in an inactive product, and also retards the hardening of the finished product.

After fermentation has set in more of the said waste liquor is added at a temperature of about 40 degrees centigrade. The mass is then agitated and a precipitant is slowly added.

The following precipitant will be found to be very effective, to wit, calcium oxid (invariably), salts of alkali metals and chiefly chlorids of alkaline earth-metals or heavy metals such as chlorids of ammonium, sodium, or potassium, a silicate such as feldspar and a phosphate such as basic slag, the last two either singly or in combination.

The following proportions are recommended for the manufacture of the fertilizer on a large scale:—To a thousand pounds of sulfite liquor of a specific gravity of from about 1.208=25 degrees Baumé to about 1.330=36 degrees Baumé which corresponds with that of the waste liquor from sulfite pulp mills containing about 5% of solid matter add from 50 to 100 pounds of selected stable manure substantially free from straw and other foreign matter, and about 50 pounds of ordinary brewers' or distillers' yeast. Allow this mixture to ferment at a temperature between 30 and 40 degrees centigrade for about twenty four hours. A certain proportion of marsh soil rich in bacteria or a liquor obtained by leaching marsh soil may be added.

A liquor of the aforesaid specific gravity contains but very little free sulfur dioxid and its sulfites are converted into sulfates by the oxidation due to its being in contact with the air. Such a liquor, while it may still show an acid reaction, can be made to ferment quite readily without further neutralization. If however the liquor to be used is taken directly from the blow pits, which is usually about 5 or 6 degrees Baumé, it may be readily concentrated to the proper specific gravity by any well known method, such as evaporation or the like.

Fermentation having set in and conversion of the organic matter being in process, add another thousand pounds of the ordinary sulfite waste liquor at a temperature of about 40 degrees centigrade. Agitate and add slowly 150 pounds of calcium oxid powder of about 60 mesh, 80 pounds of rock salt, and between 400 and 1000 pounds of either feldspar or basic slag or a mixture thereof.

The mass will soon begin to thicken, then become granular and will finally set hard. Dry the hardened mass and pulverize it.

The resultant product is a fertilizer in the form of a brown powder.

It will be readily understood that minor changes in the process, proportions and ingredients, either by substitution, reduction or addition, may be made without departing from the spirit or sacrificing any of the advantages of my invention, the scope of which is set forth in the appended claims.

What I claim as new and desire to protect by Letters Patent, is—

1. A fertilizer in the form of a dry, non-hygroscopic and non-putrescible mass comprising the solid organic and inorganic matter of sulfite waste liquor mixed with biological agents and adapted, in connection with the soil, to form a powerful culture medium for bacterial development and growth.

2. A fertilizer in the form of a dry, non-hygroscopic and non-putrescible mass, derived from sulfite waste liquor, calcium oxid and a chlorid of an alkali metal, constituting, in connection with the soil, a culture medium for the development of bacteria and growth.

3. A fertilizer in the form of a granular, non-hygroscopic and non-putrescible mass derived from biologically treated sulfite waste liquor, calcium oxid, and a chlorid of an alkali metal, constituting a culture medium for bacterial development and growth in soil.

4. A fertilizer in the form of a granular, non-hygroscopic and non-putrescible mass, derived from sulfite waste liquor treated with a biological agent and calcium oxid, and sodium chlorid, a mass constituting a culture medium for bacterial development and growth in soil.

5. A fertilizer in the form of a granular, non-hygroscopic and non-putrescible mass, derived from sulfite waste liquor mixed with biological agents, calcium oxid, and sodium chlorid, the whole constituting a culture medium for bacterial development and growth in soil.

6. A fertilizer in the form of a granular, non-hygroscopic and non-putrescible mass, derived from fermentable sulfite waste liquor mixed with biological agents, calcium oxid, and sodium chlorid, the whole constituting a culture medium for bacterial development and growth in soil.

7. A fertilizer in the form of a granular, dry, non-hygroscopic and non-putrescible mass derived from sulfite waste liquor, yeast, and manure, oxid of calcium, rock salt, feldspar and basic slag, and constituting a culture medium for bacterial development and growth in soil.

8. A fertilizer in the form of a dry, granular, non-hygroscopic and non-putrescible mass comprising the sulfates and the organic matter derived from sulfite waste liquor mixed with biological agents, oxid of calcium, rock salt, feldspar and basic slag, and adapted to promote bacterial development and growth in soil.

9. The described process of converting sulfite waste liquor into a fertilizer which consists in precipitating the solid organic and inorganic matter thereof with calcium oxid, and mixing the same with biological agents.

10. The described process of converting sulfite waste liquor into a fertilizer, which consists in precipitating the solid organic and inorganic matter thereof with calcium oxid, mixing the same with biological agents, and hardening the mass with compounds containing potassium and phosphates.

11. The herein described process of converting sulfite waste liquor, which consists in adding to such liquor biological agents, salt of an alkali metal and alkali earth metal oxid, feldspar and basic slag.

In testimony whereof I have signed this specification, in the presence of two subscribing witnesses.

EDWARD C. L. KRESSEL.

Witnesses:
 WILSON ROBERTS,
 HELEN M. BAKER.